(12) United States Patent
Nelson et al.

(10) Patent No.: US 11,586,699 B1
(45) Date of Patent: Feb. 21, 2023

(54) CONTENT PROCESSING MANAGEMENT SYSTEM AND METHOD

(71) Applicant: Accenture Global Solutions Limited, Dublin (IE)

(72) Inventors: Paul Nelson, Annapolis, MD (US); Andres Jose Aguilar Umaña, Limón (CR); Julian Ramirez Alvarado, Heredia (CR); Petr Podsednik, Prague (CZ); Johan Andrés Montealegre Cortés, San Jose (CR); Steven Denny, Ross on Wye (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/474,934

(22) Filed: Sep. 14, 2021

(51) Int. Cl.
*G06F 16/958* (2019.01)
*G06F 16/25* (2019.01)
*G06F 16/23* (2019.01)

(52) U.S. Cl.
CPC ........ *G06F 16/972* (2019.01); *G06F 16/2358* (2019.01); *G06F 16/2386* (2019.01); *G06F 16/258* (2019.01)

(58) Field of Classification Search
CPC ........ G06F 16/958–972; G06F 16/2379–2386; G06F 16/258; G06F 16/2358
See application file for complete search history.

(56) References Cited

U.S. PATENT DOCUMENTS

| | | | |
|---|---|---|---|
| 10,037,339 B1* | 7/2018 | Kleinpeter | G06F 3/0652 |
| 11,366,802 B1* | 6/2022 | Kharatishvili | G06F 16/2358 |
| 2015/0227582 A1* | 8/2015 | Gu | G06F 16/2453 |
| | | | 707/713 |
| 2016/0335311 A1* | 11/2016 | Frank | G06F 16/24565 |
| 2019/0205050 A1* | 7/2019 | Koorapati | G06F 16/185 |

* cited by examiner

*Primary Examiner* — James Trujillo
*Assistant Examiner* — Michal Bogacki
(74) *Attorney, Agent, or Firm* — Plumsea Law Group, LLC

(57) ABSTRACT

Systems and methods that offer significant improvements to current content processing management systems for heterogeneous and widely distributed content sources are disclosed. The proposed systems and methods are configured to provide a framework and libraries of extensible components that together are designed enable creation of solutions to acquire data from one or more content repositories, possibly distributed around the world across a wide range of operating systems and hardware, process said content, and publish the resulting processed information to a search engine or other target application. The proposed embodiments offer an improved architecture that incorporates manager nodes and worker (processing) nodes, where worker nodes are configured to scan and process data, while manager nodes are configured to handle all allocation of work (including throttling) and control state and failover. Such an arrangement enables the system to perform with greater scalability and reliability.

21 Claims, 9 Drawing Sheets

CONTENT PROCESSING MANAGEMENT SYSTEM AND METHOD

TECHNICAL FIELD

The present disclosure generally relates to content processing systems. More specifically, the present disclosure generally relates to systems and methods for providing a framework and libraries of extensible components that together are designed to enable creation of solutions to acquire data from one or more content repositories, process that content, and publish the resulting processed content to a search engine or other target application.

BACKGROUND

It is not uncommon for large multi-national organizations to have tens of thousands, perhaps even hundreds of thousands of databases, document repositories, storage accounts, storage drives, cloud applications and similar sources of data content spread across many countries around the globe. Further, the need for organizations to inventory, scan, fetch, summarize, index, and process all of this content from thousands of content sources and storage applications has dramatically increased in recent years. This is due to many factors including 1) government regulations for management of PII (Personally Identifiable Information) and PHI (Personal Health Information), 2) cyber security concerns, 3) content risk analysis, 4) records management and 5) simple content navigation for content discovery and reuse. Conventional techniques have depended on a haphazard and ad-hoc set of techniques, both manual (export and import) and automated (connectors and scanners). These techniques suffer from being complex, insufficiently aware of geographic boundaries and data movement controls (e.g. content can be accidentally moved out of country, in violation of government data locality regulations), expensive to manage (especially at scale for hundreds or thousands of content sources and when content systems are geographically distributed) and prohibitively expensive.

In conventional content processing systems, one architecture for solving this problem is to install content scanning and processing software for each content source, and to configure the software to push appropriate content to a central system, such as a search engine or other content storage device. This is the "Push Model" for content processing. The software installed will typically include a content "connector" which scans for content, processes the content, and then forwards the processed content to a central server. The problem with this model is that management of many connectors across many distributed systems with many configurations quickly becomes too complex, difficult, tedious and expensive to be practical. It is not scalable to hundreds or thousands of content sources. In an alternative content processing system architecture, a centralized content processing system reaches out to content sources and pulls content from those sources to be processed centrally. This is the "Pull Model" for content processing which has multiple problems. First an inattentive central controller can easily overwhelm the capability of legacy systems, causing those legacy systems to degrade or crash. Second, this model requires pulling large volumes of content from sources which can be widely distributed around the world, across slow and expensive networks, causing slow crawls using up wide-area network bandwidth. Third, this model requires data to be transferred across geographic (e.g. country) boundaries, which may be in violation of local privacy laws. Finally, this model requires all software to run on the same type of hardware and operating system, which does not account for very old legacy systems which may only be accessible from legacy operating system and hardware environments.

Accordingly, both of the content processing architectures currently in use, the "pull" model and the "push" model, suffer from multiple disadvantages which limit their ability to be widely deployed at the scale required by large organizations. Either they require the installation, configuration and management of many systems distributed across the globe (the push model) or they are slow, inefficient, unresponsive to the compute resource requirements needs of the local legacy system, and non-compliant in terms of data movement across country borders (the pull model).

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

SUMMARY

Figure 1:
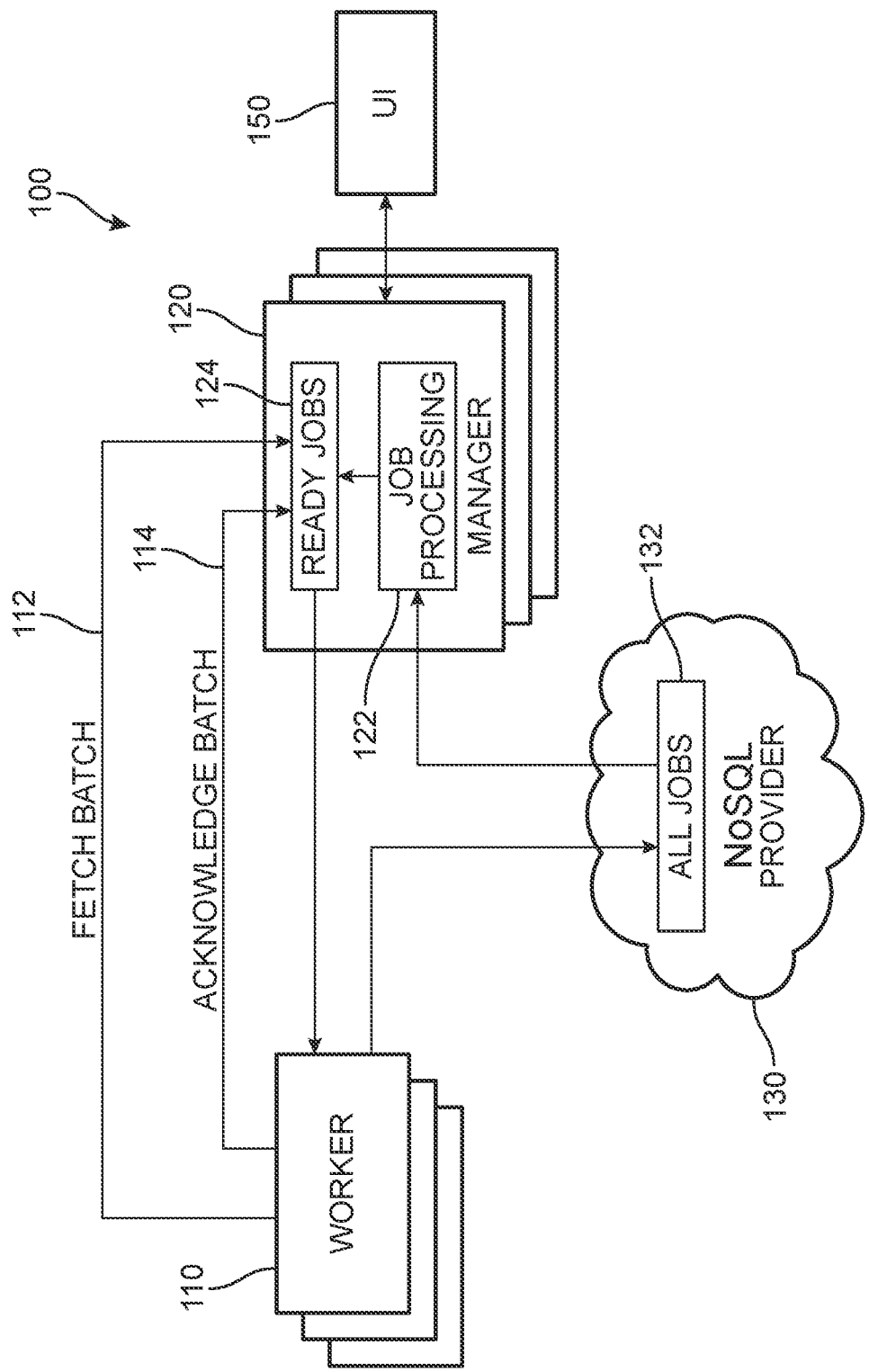
FIG. 1 is a schematic diagram of an overview of an embodiment of a content processing management environment.

Systems and methods that offer significant improvements to current content processing management systems are disclosed. The proposed systems and methods are configured to provide a framework and libraries of extensible components that together are designed enable creation of solutions to acquire data from one or more content repositories, process the content, and publish the processed content to a search engine or other target application. The proposed embodiments offer an improved architecture that incorporates manager nodes and worker (processor) nodes, where worker nodes are configured to scan and process data, while manager nodes are configured to handle all allocation of work (including throttling) and control state and failover. Such an arrangement enables the system to perform with greater scalability and reliability with a lower cost to manage while simultaneously obeying compliance guidelines about moving data across country boundaries.

In one aspect, the disclosure provides computer-implemented method of processing digital content via a content processing management system. The method includes a first step of launching, at a plurality of computing devices, a plurality of processing nodes, each processing node including at least one tag that determines which job type can be performed by the processing node and a second step of fetching, by the first content processing management system, a plurality of content sources, each content source being associated with one or more tags for that content source. A third step includes initiating, by the first content processing management system, one or more content processing scans of one or more content sources by creating one or more start jobs in a queue stored in a job database, the jobs being tagged to the content source being scanned, and a fourth step includes grouping, at the first content processing management system, the jobs of the plurality of jobs into batches based on the content source associated with the job such that all jobs in a single batch have the same tag. The method further includes a fifth step of receiving, from a first processing node and at the content processing management system, a request for a batch of one or more jobs with at least a first tag matching the tags of the requesting processing node, a sixth step of providing, from the content processing management system, a first batch of jobs to the first processing node, each job in the first job set including a tag matching the first tag, and a seventh step of processing, at the first processing node, each job via a set of pipelines, wherein each pipeline of the set of pipelines is configured to fetch and process content according to a defined list of tasks. In addition, the method includes an eighth step of adding, at the first processing node and via a database provider, new sub-jobs to be processed to the job database for each job being processed, a ninth step of grouping, at the content processing management system, batches of newly added sub-jobs based on their tags, and a tenth step of providing, at the content processing management system, batches of newly added sub-jobs to processing nodes when requested, such that the jobs provided match the tags of the corresponding requesting processing node, until there are no more jobs remaining to be processed.

In another aspect, the disclosure provides a non-transitory computer-readable medium storing software comprising instructions executable by one or more computers which, upon such execution, cause the one or more computers to: (1) launch, at a plurality of computing devices, a plurality of processing nodes, each processing node including at least one tag that determines which job type can be performed by the processing node; (2) fetch, by the first content processing management system, a plurality of content sources, each content source being associated with one or more tags for that content source; (3) initiate, by the first content processing management system, one or more content processing scans of one or more content sources by creating one or more start jobs in a queue stored in a job database, the jobs being tagged to the content source being scanned; (4) group, at the first content processing management system, the jobs of the plurality of jobs into batches based on the content source associated with the job such that all jobs in a single batch have the same tag; (5) receive, from a first processing node and at the content processing management system, a request for a batch of one or more jobs with at least a first tag matching the tags of the requesting processing node; (6) provide, from the content processing management system, a first batch of jobs to the first processing node, each job in the first job set including a tag matching the first tag; (7) process, at the first processing node, each job via a set of pipelines, wherein each pipeline of the set of pipelines is configured to fetch and process content according to a defined list of tasks; (8) add, at the first processing node and via a database provider, new sub-jobs to be processed to the job database for each job being processed; (9) group, at the content processing management system, batches of newly added sub-jobs based on their tags; and (10) provide, at the content processing management system, batches of newly added sub-jobs to processing nodes when requested, such that the jobs provided match the tags of the corresponding requesting processing node, until there are no more jobs remaining to be processed.

In another aspect, the disclosure provides a system for processing digital content via a content processing management system, the system comprising one or more computers and one or more storage devices storing instructions that are operable, when executed by the one or more computers, to cause the one or more computers to: (1) launch, at a plurality of computing devices, a plurality of processing nodes, each processing node including at least one tag that determines which job type can be performed by the processing node; (2) fetch, by the first content processing management system, a plurality of content sources, each content source being associated with one or more tags for that content source; (3) initiate, by the first content processing management system, one or more content processing scans of one or more content sources by creating one or more start jobs in a queue stored in a job database, the jobs being tagged to the content source being scanned; (4) group, at the first content processing management system, the jobs of the plurality of jobs into batches based on the content source associated with the job such that all jobs in a single batch have the same tag; (5) receive, from a first processing node and at the content processing management system, a request for a batch of one or more jobs with at least a first tag matching the tags of the requesting processing node; (6) provide, from the content processing management system, a first batch of jobs to the first processing node, each job in the first job set including a tag matching the first tag; (7) process, at the first processing node, each job via a set of pipelines, wherein each pipeline of the set of pipelines is configured to fetch and process content according to a defined list of tasks; (8) add, at the first processing node and via a database provider, new sub-jobs to be processed to the job database for each job being processed; (9) group, at the content processing management system, batches of newly added sub-jobs based on their tags; and (10) provide, at the content processing management system, batches of newly added sub-jobs to processing nodes when requested, such that the jobs provided match the tags of the corresponding requesting processing node, until there are no more jobs remaining to be processed.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

The following disclosure describes systems and methods for providing search engine independent content processing frameworks for unstructured, structured and semi-structured data. The enterprise search tool framework supports complex content enrichment, contains a staging repository for efficient indexing, enables document-level security, and provides connectors for acquiring data from multiple content sources. The processed content can then be smoothly indexed or otherwise published, allowing end-users to effectively search, explore, and derive insights from the content. More specifically, the proposed framework applies a tag-based job assignment process that is configured to offer improved scalability, reliability, credential and workflow management, statistics and error reporting, flexibility in scheduling, and user interface experiences.

In one embodiment, the proposed systems and methods offer content ingestion and processing technology for unstructured data, such as Office documents, PDFs, web pages, images, voice, and videos. The framework provides connector components to a variety of unstructured enterprise content sources, including file shares, SharePoint™, Documentum™, OneDrive™, Box.Com™, SalesForce.com™ ServiceNow™, Confluence™, Yammer™, and others. The framework enables connectivity, scanning, cleansing, enrichment, and publishing of content to enterprise search, unstructured content analytics, and natural language processing applications.

In another embodiment, the proposed systems and methods offer content ingestion and processing technology for structured data, such as relational databases, No-SQL databases, data lake files, data set registries, dashboards and reports. In this embodiment, the framework provides connector components for a variety of structured content sources, including relational database tables (RDBs), Google BigQuery™, Amazon RedShift™, Apache Hadoop™, Apache Hive™, Collibra™ Tableau™, Teradata™, and PowerBI™.

In some embodiments, the framework and libraries include extensible components designed to enable creation of solutions to acquire data from one or more content repositories (such as file systems, relational databases, cloud storage, or content processing management systems), extract metadata and text from the documents or records, analyze, modify and enhance the content and metadata if needed, and then publish each document or record, together with its metadata, to a search engine or other target application. In one embodiment, each individual piece of processing functionality within the framework is a modular component that can be used by itself, or in conjunction with other components to create an application.

While current frameworks rely on the downloading, installation, configuration and execution of separate connector applications for each source, where that connector is responsible for all functionalities including fail over and state control, the proposed embodiments offer an improved architecture that incorporates manager nodes and worker (processor) nodes, where worker nodes are configured solely to scan and process data, while manager nodes are configured to handle all allocation of work (including throttling) and control state and failover. Such an arrangement enables the system to perform with greater scalability as well as reliably provide the features described herein especially when deployed over a wide-ranging heterogenous network spread across the globe.

For purposes of reference, several terms will be used throughout this application. As a general matter, a content source refers to the configuration of a content repository or "content source" (SharePoint™, SMB file system, RDB), and includes information about the server URL, credentials, connection configuration and any processing workflow. In addition, a central processing management system refers to a node or a cluster of multiple nodes for failover and scalability that oversee the configuration for content sources (accessible through a REST API or administrative user interface), and also manages the initiation of content source scans, creation of initial scanning jobs, and jobs distribution between processing nodes. A processing node refers to a node in charge of processing jobs of a content source, including the download and installation of components, fetching metadata and content from the content source, extracting text, processing content and metadata, and publishing to other repositories. A job database refers to a database repository to store configuration and to keep the states of the jobs and nodes, as well as manage all communication to the database repository. For example, a job database may be a NoSQL database. A job refers to the items or sub-jobs (typically databases, tables, documents and folders) from content sources to be processed by the nodes. Such sub-jobs will contain IDs, URLs, metadata, access methods (with usernames and passwords), binary content, etc. Jobs will also hold information about their processing state (e.g., available, in-progress or completed, which node is processing the job, etc.). A tag refers to an identifier used to determine where a job should be processed (e.g., it could be a geographical location, an operating system, a specific language version, etc.). A queue refers to a queue inside the repository configured in the NoSQL provider, used by the nodes to store and read the jobs obtained from the content source. An artifact repository refers to a local or online repository that contains the software components (e.g., Java JARs, Microsoft Windows DLLs, python programs, etc.) that will be executed to process jobs. The processing nodes will download and install the components as required based on the content source configuration.

In different embodiments, the system is configured to address and solve a host of technical problems that have been associated with current content processing management systems, including issues that stem from attempting to use the system to crawl content from tens of thousands of network shares, SharePoint site collections, relational database tables and the like. In such cases, the system may slow as the number of content sources gets large, content sources become overwhelmed making content unavailable to the legacy system users, management of credentials can become cumbersome should credentials change and need to be applied to a (potentially large) number of sources, wide-area networks become overwhelmed with large volumes of binary data being scanned, data is accidentally transferred across country borders in violation of government regulations, externally addressable content servers or proxies may need to be installed in remote locations in violation of company security policies and providing attack vectors for cyber hackers, management of workflow can become cumbersome when workflow components need to be mixed and matched across large numbers (e.g. thousands or 10's of thousands) of sources, and statistics and errors must be manually loaded into a third-party system to perform amalgamation and reporting. The worker-manager node architecture described herein addresses each of these issues.

In addition, the proposed embodiments are configured to improve reliability, reduce the instances in which crawls appear to hang due to state issues, reduce issue failures, target execution of crawling to specific servers to allow for specific connectors to run in specific geo locations or on specific versions of Java, facilitate workflow updates and the ability to assign multiple workflows to seeds, replace the various workflows with a single workflow that shows all "categories", and adds specific workflows such as "initialize", "crawl start", and "crawl end" workflows.

For purposes of introduction, FIG. 1 depicts an overview of an embodiment of an architecture for a content processing management environment ("environment") 100. As noted above, the proposed framework represents a scalable and resilient server cluster for secure acquisition, processing, and publishing of unstructured and structured content. In different embodiments, the framework supports a wide variety of content repositories for content acquisition and content publishing and/or indexing. New components may be developed and deployed on top of it.

As shown in the embodiment of FIG. 1, a NoSQL provider 130 (e.g., Elasticsearch, Mongo DB, HBase, etc.), also referred to herein simply as "NoSQL", is configured to submit jobs 132 to a job processing module 124 of one of a plurality of manager nodes 120. Note that, while a No-SQL server is specified in the embodiment, any database can be used. While multiple manager nodes are supported by the system for performance reasons, only one will be designated (by competition) as the "main manager" node. The main manager will be responsible for designated monitoring manager and worker nodes for failure and performing actions toward recovery, such as resetting work in progress from failed workers or reallocating seeds to other managers (see FIG. 4).

In different embodiments, each job is generated from seeds that represents data to be scanned. For example, a seed can refer to a distinct piece of content to crawl (URL, SMB or local file path, S3 bucket, database JDBC connection string, etc.). Rather than single content sources with many seeds that would create a file of directories to scan, the proposed system interacts with each seed as a separately managed job, enabling the system to handle hundreds of thousands of seeds, allowing for bulk operations on large sets of seeds. The job processing module 124 processes incoming jobs from a seed to produce ready jobs 124, or jobs that are prepared for allocation to worker nodes (aka processing nodes) 110. As noted above, a seed (and all the documents it contains) will be managed by only one manager node. Such a limitation ensures that nodes will not compete for content to process. The manager node 120 will group jobs to be processed into batches of ready jobs 124. The worker nodes 110 can then fetch batches 112 from the queue of ready jobs 124 when it has capacity to process the batch, and generate acknowledgements 114 as each batch is safely obtained. Furthermore, to allow for throttling of requests to a content server, all seeds for that server will be managed on a single manager node, thereby avoiding throttle in a distributed manner. If a content server needs the connector to be throttled, the manager node will be able to slow the rate at which batches of jobs are released to the worker.

Each job will be to scan a directory or fetch and process a document, a file, structured databases table or portion(s) thereof. The worker nodes 110 then scan and process data. For example, worker nodes will register the content they are processing in case of failure and managers will keep track of what has been allocated to the workers so that content is not processed twice. Thus, worker nodes are simplified—they do not manage queues, claims, or failover. Rather, they are designed as basic "fetching" machines that are configured to obtain a batch of jobs to fetch (directory contents or documents) and then proceed to fetch and run them through processing workflow. In addition, instead of content sources, the environment 100 includes a connector configuration and workflow fragments (including publishing). This decoupling allows for seeds to share connector configurations and workflow fragments in any combination, a feature important for the scalable management of thousands of content sources. Note that worker nodes (aka processing nodes) are client applications which pull data from the manager nodes. Worker nodes are not servers themselves and cannot be addressed direct by the manager node (or anything else, for that matter) from the outside. This is critically important to create a secure, widely-distributed network by eliminating possible attack vectors for cyber hackers.

In different embodiments, on entry, the type of the seed will be given and it will be assigned to a connector configuration of that type of content source technology. Connector configurations will contain information such as connector type, connection credentials and connector scanning parameters (including the "include" and "exclude" patterns). In addition, workflow fragments will be independent objects that can be assigned to one or more seeds. Should a seed not have any workflow fragments assigned, the default workflow for the seed will result in the information being published automatically to the local search engine index. In other words, a seed with zero workflow configuration can be crawled, such that the corresponding content will be immediately searchable via the local search engine index.

In some embodiments, as batches are received, worker nodes will load and maintain resident the connector configurations, software components and workflow fragments needed to process the jobs, using a Least Recently Used caching mechanism. The completed jobs are submitted back to the NoSQL 130. A user interface 150 is provided to allow the end-user to view content management processes and status. The framework thus offers a centrally managed distributed data scanning infrastructure. Additional details regarding components of environment 100 will now be discussed with reference to FIGS. 2-6.

As noted above, system nodes can be either manager or worker nodes, based on the setting of a particular Java property or environment variable on start-up. Once a node is a designated as a manager (or worker), it will remain a manager (or worker) until it restarts. If the node is not designated as either a manager or worker node, it will default to be a worker node only. However, the system is configured to enable a node to run as both a worker and manager, and allow for a single node system or a small multi-node system with failover for both managers and workers. In general, manager nodes are responsible for the admin UI, controlling content scans (aka content "crawls"), the allocation of work to worker nodes and for monitoring nodes which are down and taking corrective actions (such as designating a new main node and correcting the status of jobs that were being processed during failure).

A manager node will be responsible for the seeds actively being scanned. Where there is more than one manager, a seed (and all the documents it contains) will be the sole responsibility of one manager. Seeds that are controlled by the same throttle policy will be assigned to same manager node, so these seeds can be throttled together. Allocation of seeds to managers will be performed at the time a crawl starts. Where there is more than one manager in a system, responsibility for seeds will be distributed across the managers as evenly as possible, within the constraints imposed by the throttle policies.

Figure 2:
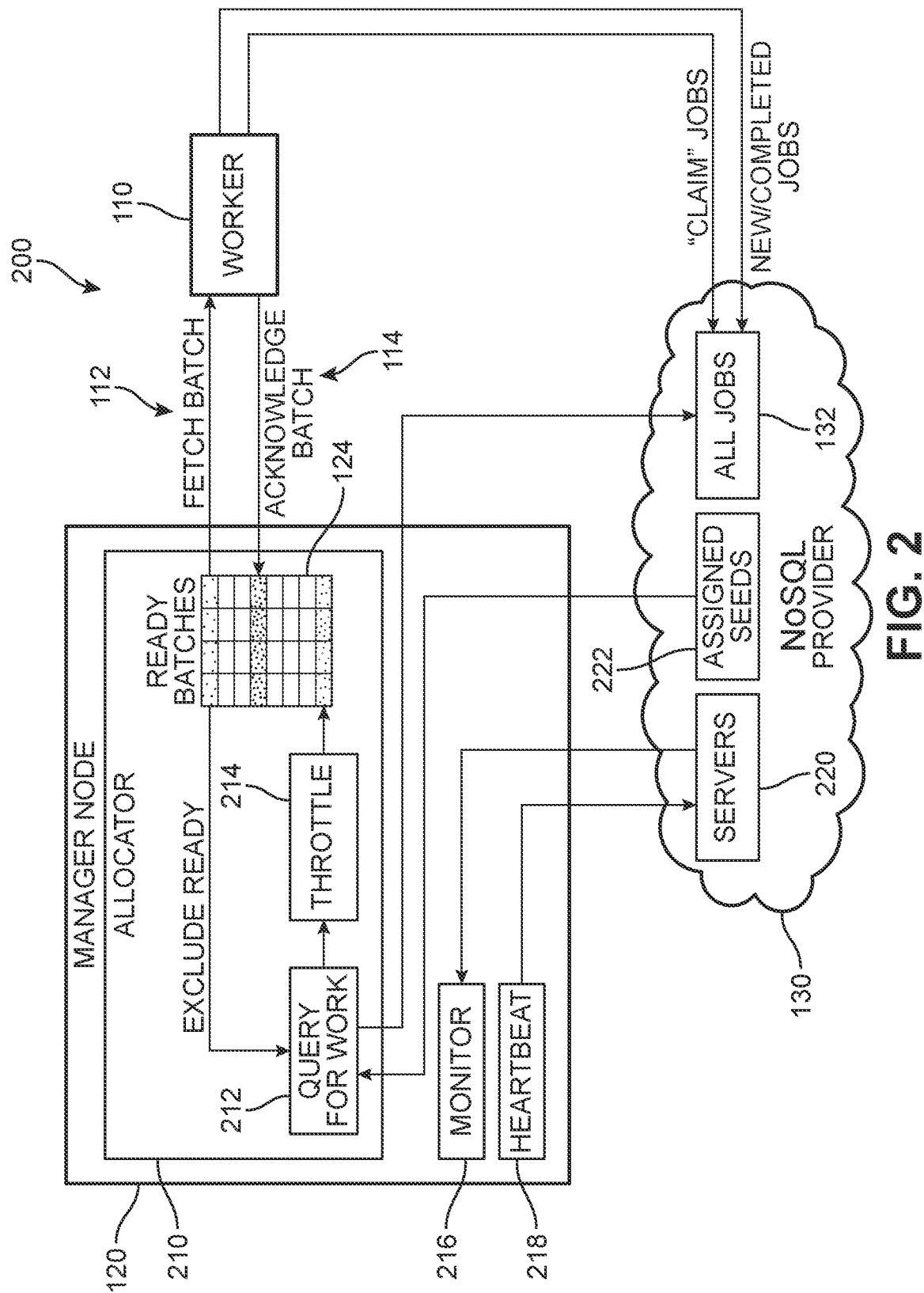
FIG. 2 is a schematic diagram of an architecture of an embodiment of a manager node within the content processing management environment of FIG. 1.

In FIG. 2, additional details for manager 120 of FIG. 1 are shown in a schematic flow diagram 200. The manager is responsible to gather jobs that need to be processed and then make them available to workers, allowing workers to fetch the jobs from the manager in batches.

As a general matter, control of crawls will be via a REST API and/or administration user interface and will be controlled from the main manager. Should a manager node other than the main manager receive a crawl (aka content source scan) control request, it will forward the request to the main manager. A start request will contain one or more seed ids to start and the type of crawl. Each seed will be considered in turn and if a crawl is already in progress for a seed (i.e., the status is not stopped/errored), the request will be ignored. If no crawl is running for that seed, the seed id will be marked in NoSQL as active and will be allocated to a manager node based on the number of nodes and the throttle policies in force. The manager will then respond by returning the "seed", which will contain information about the status of the crawl, including the manager the seed has been allocated too and/or any error that prevented the crawl from starting (such as the given seed already being in progress or not being found). Starting a crawl of a seed will involve allocating a seed to a specific manager (based on the number of managers, their existing allocation and the throttle policies in force) and then adding the "crawl root" id of the seed to the processing queue. The main will then set that crawl seed to "active".

For purposes of reference, it can be understood that there are multiple crawl types. Start requests will specify a crawl type to define the actions when crawling. In one example, possible crawl types include: full, incremental, and continue. Full will scan and process all jobs through workflow for processing. Scanning and processing queues are cleared before commencing and any "state" of previously crawled jobs (snapshot tables etc) is ignored. Incremental crawls will identify and process only updated, added or deleted jobs which are passed to the workflow for processing. Incremental scans will depend on the method of change detection (e.g., snapshot, timestamp, update token, etc.). Scanning and processing queues are cleared before commencing. Continue scans occur to resuming a failed scan, and allow the operator to continue a failed or stopped scan. Scanning and processing queues will not be cleared before commencing. The continue scan will retain its previous type (full/incremental).

In addition, the system can operate under three additional request types: stop, pause, and resume. A stop request will contain one or more seed ids to stop. If a request contains seed ids of seeds that are not currently running, those inactive seeds will be ignored, but the rest of the request be actioned. The main manager will set the status of the seeds to stopping and send a "stop" to the manager responsible for those seeds which will cause that manager to: (a) lock the in-memory processing queue; (b) remove jobs for the given seed(s) from any batches and remove any empty batches (that only had jobs for that seed); (c) unlock the queue; and (d) send a request to each worker node (that has received batches for that seed) to "release" any jobs it has not begun processing that seed. Once the assigned manager sees all the jobs for that seed have completed, it will advance the state of that seed to stopped. A pause request will contain one or more seed ids to pause. If a seed in the request is not currently active, that part of the request will be ignored. Pausing will be similar to the stop request, except the state of the seed(s) will be set to "pausing" and then paused. A resume request will contain one or more seed ids to resume. If the seed is not currently paused, that part of the request will be ignored. The seed state will be set to active, which will allow the manager to resume allocating work.

In different embodiments, schedules will only be run on the main manager. When a schedule fires, it will be equivalent of the manager receiving a start request, while anything that is running already will be ignored. Schedules may cause multiple seeds to start. Schedules will be loaded when the manager becomes main manager (either at start-up or when a manager becomes main because of a failure) and updated by incoming requests from a REST API or the administrative user interface.

In FIG. 2, the manager node 120 includes an allocator module 210, which will communicate with NoSQL provider 130 in order to obtain assigned seeds 222, generate work queries 212, and allocate the seeds as ready batches 124 to a node. For example, when a seed starts, it will be assigned to a manager. If the starting seed had a throttle policy, determined by throttle component 214, and any in-progress crawl has the same policy, the main manager will assign the seed to the same manager as the previous seed (to maintain the assertion that seeds with the same throttle policy run on the same manager). If the seed does not have a throttle policy, or no other seed with the same policy is running, then the main manager will choose a manager node, while seeking to balance the number of seeds across managers.

Figure 3:
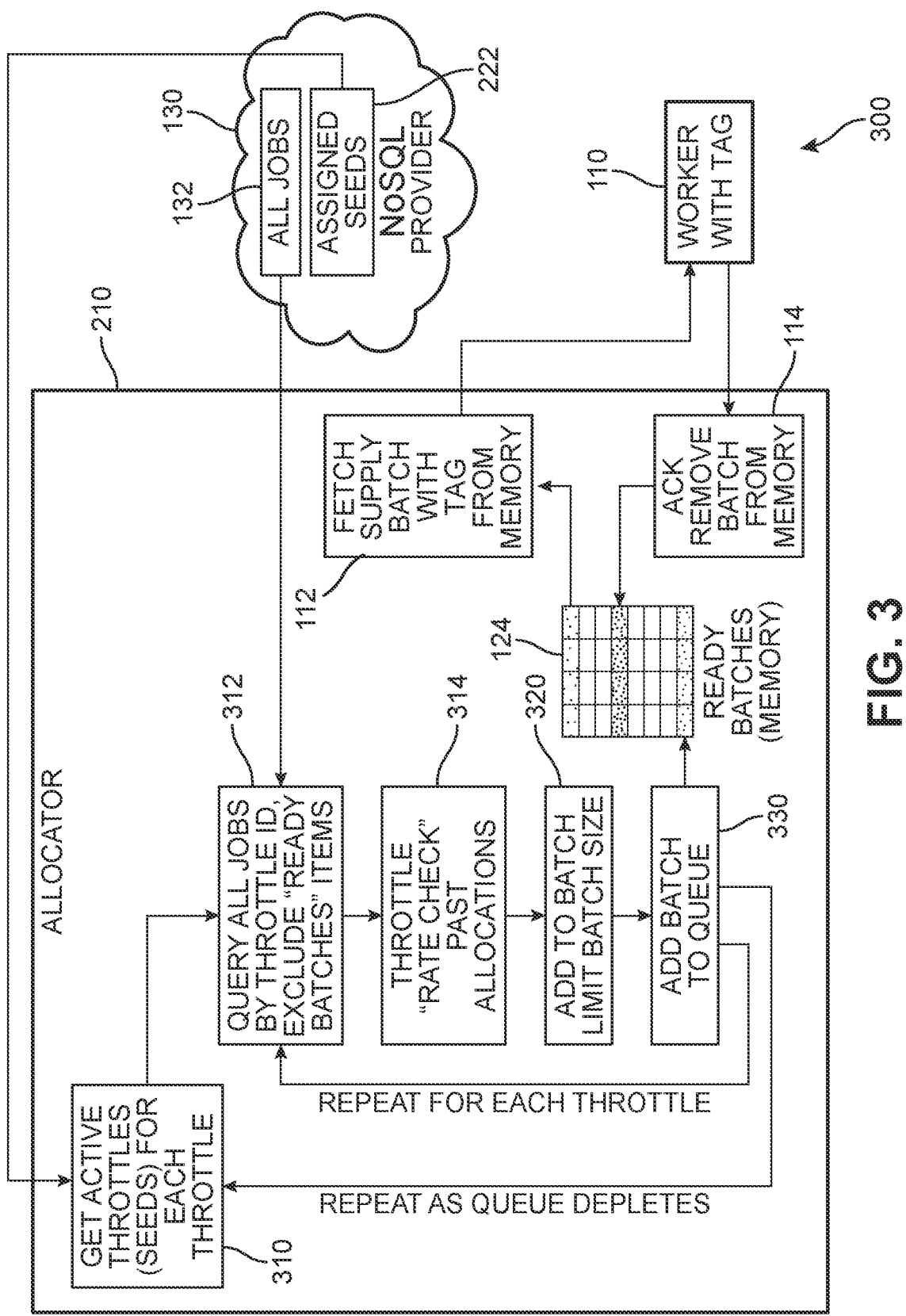
FIG. 3 is a schematic diagram of an architecture of an embodiment of an allocator module for the manager node of FIG. 2.

Referring to FIG. 3, a schematic flow diagram 300 of a distribution of work by the allocator module 210 is depicted. As jobs are provided from the NoSQL 130 to the allocator module 210, active throttles (seeds) are obtained in a first stage 310. The jobs are queried for each throttle in a second stage 312. Throttling (e.g., rate check with reference to past allocations) is applied in a third stage 314, and the jobs are added to a batch in a fourth stage 320, though batch size will be limited. The batch is then added to the ready batches 124 queue in a fifth stage 330. As the queue depletes, additional active throttles (seeds) are obtained from the NoSQL 130 and the process begins again. Additional active throttles will continue to be obtained, and this process is repeated for each throttle. Greater details regarding this process are provided below.

In different embodiments, the manager will group running crawls by throttle ID. By default, the throttle ID will be the seed ID. A single manager will be responsible for all crawls using the same throttle ID. Allocation of the throttles to a manager will be done at the time the crawl starts. The manager will maintain in memory queues of batches of jobs that are ready to be picked up by worker nodes. For performance reasons, there will be separate queues for jobs requiring scanning versus fetching/processing. The batches in these queues will include a number of IDs to process (or scan) and the type and configuration of the connector required to process them. Periodically, when the in-memory queue is below a certain threshold, the manager will replenish it. The manager will perform a query to retrieve jobs from the NoSQL queue. The manager will select jobs that are available, and not already in the in-memory queue that are part of a seed that is allocated to this manager. As shown in second stage 214, throttling will be performed and the manager will count the number of documents added to the memory queue for each "throttle ID". Should the throttle rate be reached, the manager will simply stop adding batches for this throttle id to the memory queue. This will cause the queues for that throttle id to empty and reduce the rate of processing. Throttling information will only be held in memory. If a manager fails, the rate will be at or below the throttle, meaning that a new manager can afford to start without reference to the previous throttle. Once a batch is in the memory queue, it can be used to fulfil a request made by a worker node. The memory queue is a simple first in first out queue—the first request from a worker will get the first batch, the next will get the second and so on. Worker (aka processing) nodes will specify the Tag(s) of the types of jobs they can handle when they request a batch. Only jobs from content sources with tags that match the tags on the Worker node will be returned to the worker node. This ensures that jobs are routed to worker nodes that are capable of handling the job—e.g., the job is routed to a worker node which is in the correct geographic location or availability zone, is running on the right operating system, etc. Once a batch has been acknowledged as received by the worker, it will be removed from the memory queue. When the manager sends a batch to the worker, it should note the seeds in the batch and the worker the batch was sent to. This will allow a manager to later instruct a worker to stop processing jobs for a seed in the case the seed is paused or stopped.

In different embodiments, in the case of a manager failure, the main manager will reallocate the seeds allocated to the failed manager to other managers. An embodiment of this process is depicted in flow diagram 400 of FIG. 4. In the case of a new manager being added, the main will try to allocate seeds from other managers to maintain a balance. It should be able to reallocate seeds without impacting crawls (i.e., no pause required) by "un-allocating" the seed from manager one, releasing the seed on manager one (to remove the seed from any unsent batches) and then allocating the seed to manager two.

Figure 4:
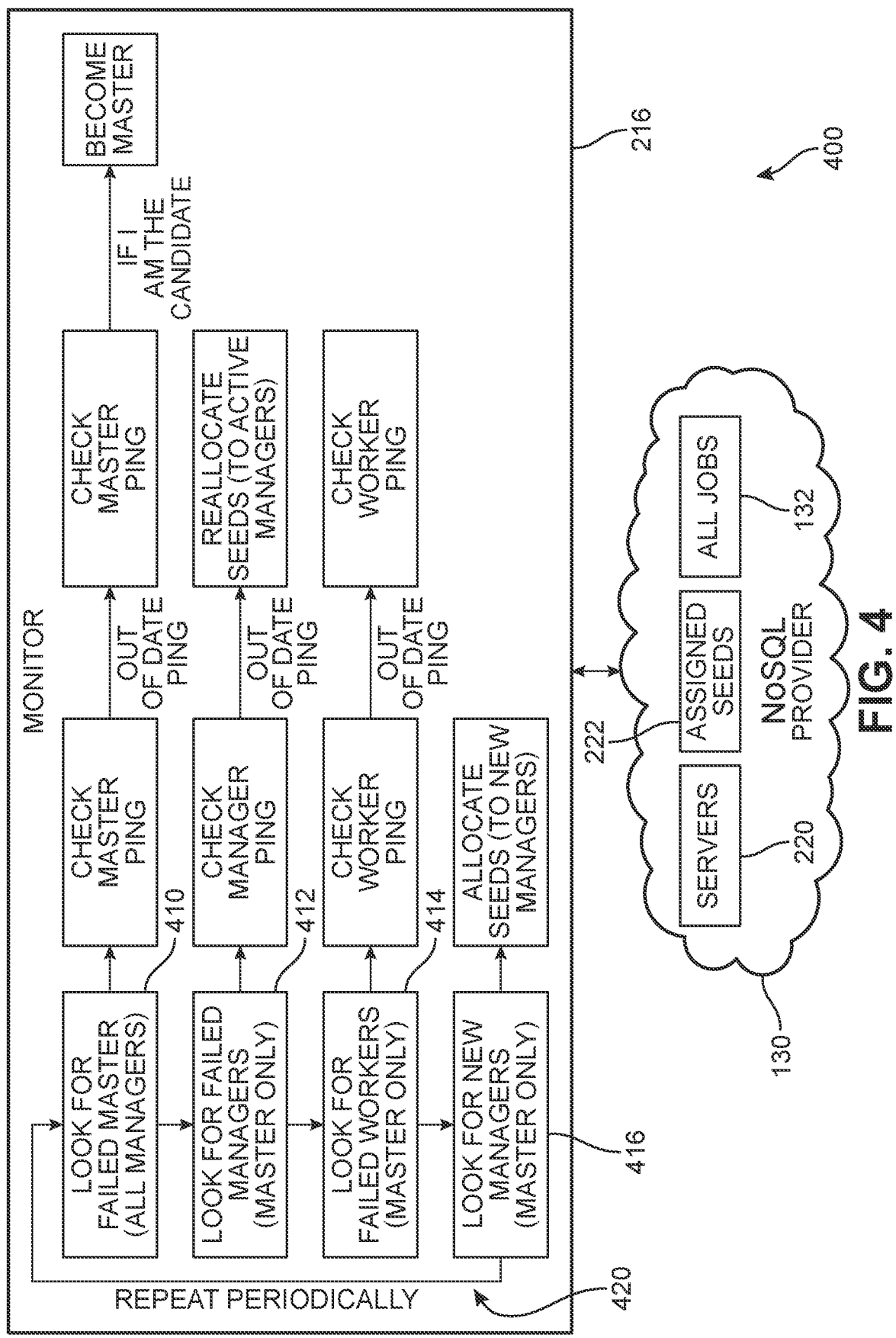
FIG. 4 is an example of processing flows for a monitor module of the manager node of FIG. 2, according to an embodiment.

As shown in FIG. 4, the monitor module 216 is configured to detect failed nodes across three levels: identification of a failed main manager, identification of failed managers, and identification of failed workers. Monitor module 216 performs monitoring by examining a heartbeat entry in the NoSQL database and "detecting" a failure when that heartbeat is out of date by more than a certain period (i.e., 2 heartbeat periods=30s heartbeats). All non-main manager nodes will monitor the main manager for a failure and try to become the main manager if that is the case, as shown in a first level 410. The Main manager election is a rapid process to ensure that only one main manager exists. When the current main manager fails, a new one is immediately elected. In order to become the main manager after a failure, servers only need to find if they are the "oldest manager alive". If they are oldest, they become the main manager.

Once the new main manager has been "elected", it's operation will change to reflect its new role. In a second level 412, it can be seen that only the main manager will monitor for failed (non-main) manager nodes. In some embodiments, if a manager fails, the main manager will respond by one or more of the following actions: (a) allocate all the seeds from the failed manager to other managers and/or (b) remove the failed manager from the nodes table or mark it as failed for debugging purposes.

In a third level 412, the main manager node monitors for failed worker nodes. If a worker node is detected as failed, the main node will perform one or more of the following actions: (a) mark all jobs noted as in progress by that worker as available so that the jobs may be added to added to new batches, (b) signal all managers to "reset" the status of any in memory batches that were sent to that worker but had not been acknowledged so that the batch can be fetched by another worker, and (c) remove the failed worker from the nodes table or just mark it as failed for debugging purposes. Toward an end 416 of this process, the monitor module 216 will look for new managers. The entire process 420 is repeated periodically.

Figure 5:
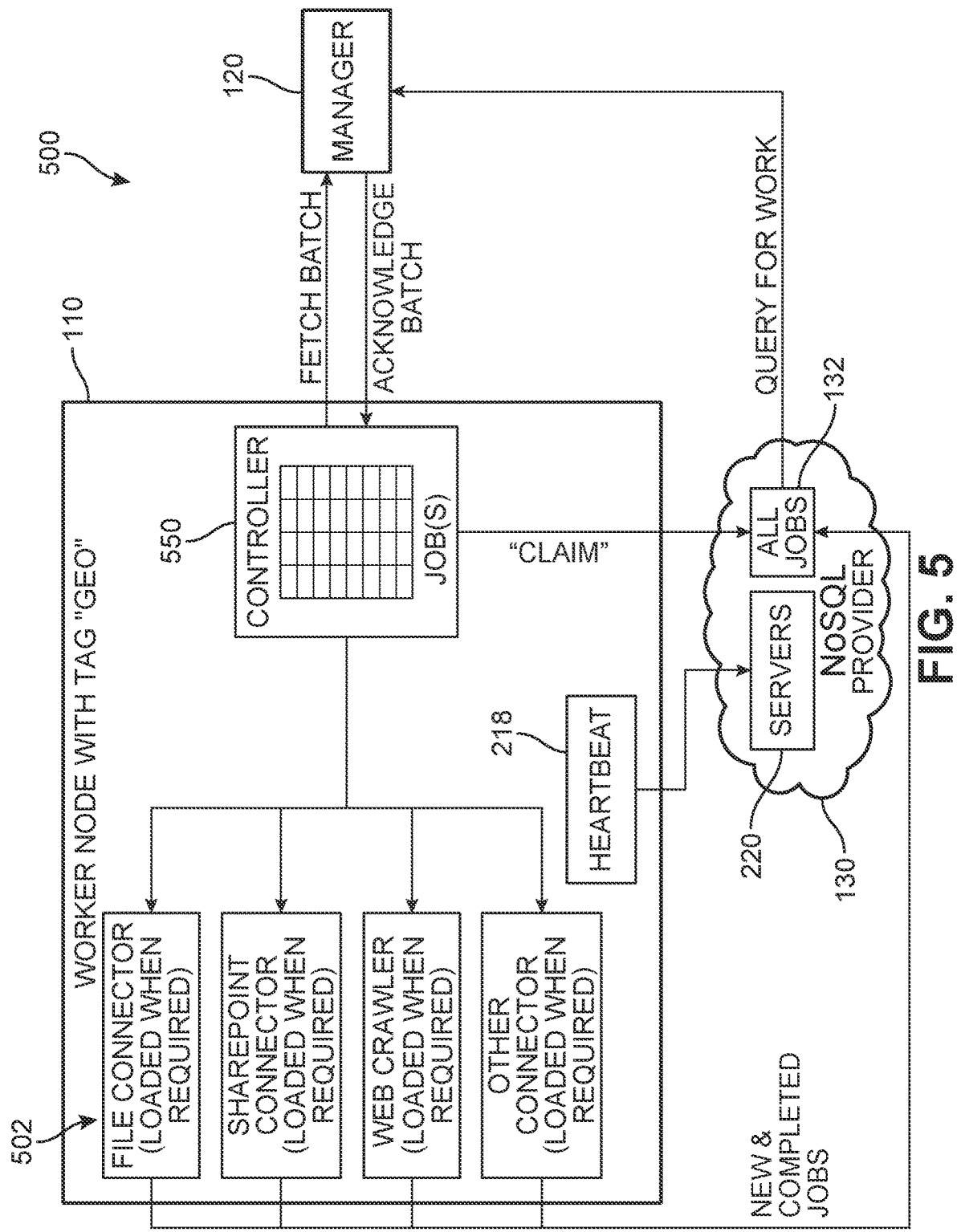
FIG. 5 is a schematic diagram of a worker node within the content processing management environment of FIG. 1, according to an embodiment.

FIG. 5 is a schematic flow diagram 500 presenting additional details regarding the worker node 110 (also known as a processing node). In general, a node will be a worker node if a particular Java property or environment variable is set to the worker node setting when it starts. Once a node is a designated as a worker, it will remain a worker until it restarts. In some embodiments, if the node is designated as neither a manager or worker node, it will default to being both. Further, a java property or environment variable is also used to specify the tag or tags assigned to the worker. This defines what types of jobs the worker is capable of executing (e.g. where the worker is geographically located, on what operating system the worker is running, etc.). Note that, in other embodiments, it is possible for the tags to be computed automatically, based on metadata from the cloud provider, geographic location computed from IP addresses, operating system information gathered from the execution environment, and the like. These tags specify what sorts of jobs the worker is capable of accepting when it requests jobs from the manager node.

As shown in FIG. 5, upon start-up the worker node 110 will register itself (including any tags it may be configured with) in the NoSQL 130 and will then start issuing heartbeats 218. The worker node 110 then enters its general processing loop via controller 550. Initially, the queues are empty, so the controller 550 will attempt to start fetching batches of jobs to do. Furthermore, the worker node will hold in memory queues of jobs that it has received from the managers. Separate queues will be used for jobs containing jobs to process versus jobs to scan. A thread will monitor that queue periodically and if the queue size is below a certain threshold, the thread will request further batches of jobs to process.

In different embodiments, requesting a batch will be by way of a REST call to the manager. The manager will return one or more batches. The worker node (also known as a processing node) can process each batch and set each job in the batch to "in progress" in NoSQL 130 to confirm its receipt. As noted earlier, once all jobs have been marked, the worker will send an "acknowledge batch" to the manager. This will cause the manager to remove the batch from its "ready batches" queue. Requests for batches from a worker node will be directed in a round-robin approach across all active managers. Should a request fail, the worker will move on to the next manager, assuming the error was transient, and the manager has failed will be marked as such by the main manager in due course.

The batch will contain a number of jobs to process and the type and configuration of the connector on which they should be run; these configurations will be loaded when required. As shown in loop 502, batches will then be processed by the appropriate connector. Some non-limiting examples are shown simply for purposes of illustration, including File Connector, SharePoint Connector, ASPIDER, other connectors, etc. If an appropriate connector is not loaded, the worker node will load it from an artifact repository automatically before processing the data. The worker node also maintains a list of loaded connectors and the last time they were used and will unload unused connectors after a period of time. Once a job is complete, it will be marked as such in the central NoSQL queue.

In different embodiments, worker nodes are configured to rely on fetching batches from a manager to obtain work. In the same fashion as the manager queries NoSQL, the worker node should "back off" the frequency of its requests when it continues to find no batches available, but "reset" to a frequent poll when it is receiving batches. In addition, the number of requests to the manager can be reduced by the worker telling the manager (in the request) how many jobs it would take to "fill" it's queue. The manager can then return more than one batch (if it has more than one) to try to fill the queue in a single request. The batches could then be marked as in progress and acknowledged in turn (i.e., one batch at a time), although multiple batches in a single request may also be acknowledged.

Similarly, a worker node is not be responsible for the distribution of work; rather, a request is sent to the appropriate manager for work. Workers always request (e.g., pull as a client) work from the manager nodes. Worker nodes are not listeners and never receive (e.g., as a server) requests from the outside. Since they cannot passively receive requests from the outside, this makes the workers more secure and difficulty to hack. In addition, worker nodes will not need to communicate with other worker nodes. They will however communicate with manager nodes to fetch a pre-allocated batch of content to process, and acknowledge successful receipt of a batch and that the batch is being processed. The worker nodes also receive communications from manager nodes to mark processed jobs as complete in the NoSQL database, log errors and information to the NoSQL log "database", and/or log statistics about jobs scanned and processed to the NoSQL log "database".

Figure 6:
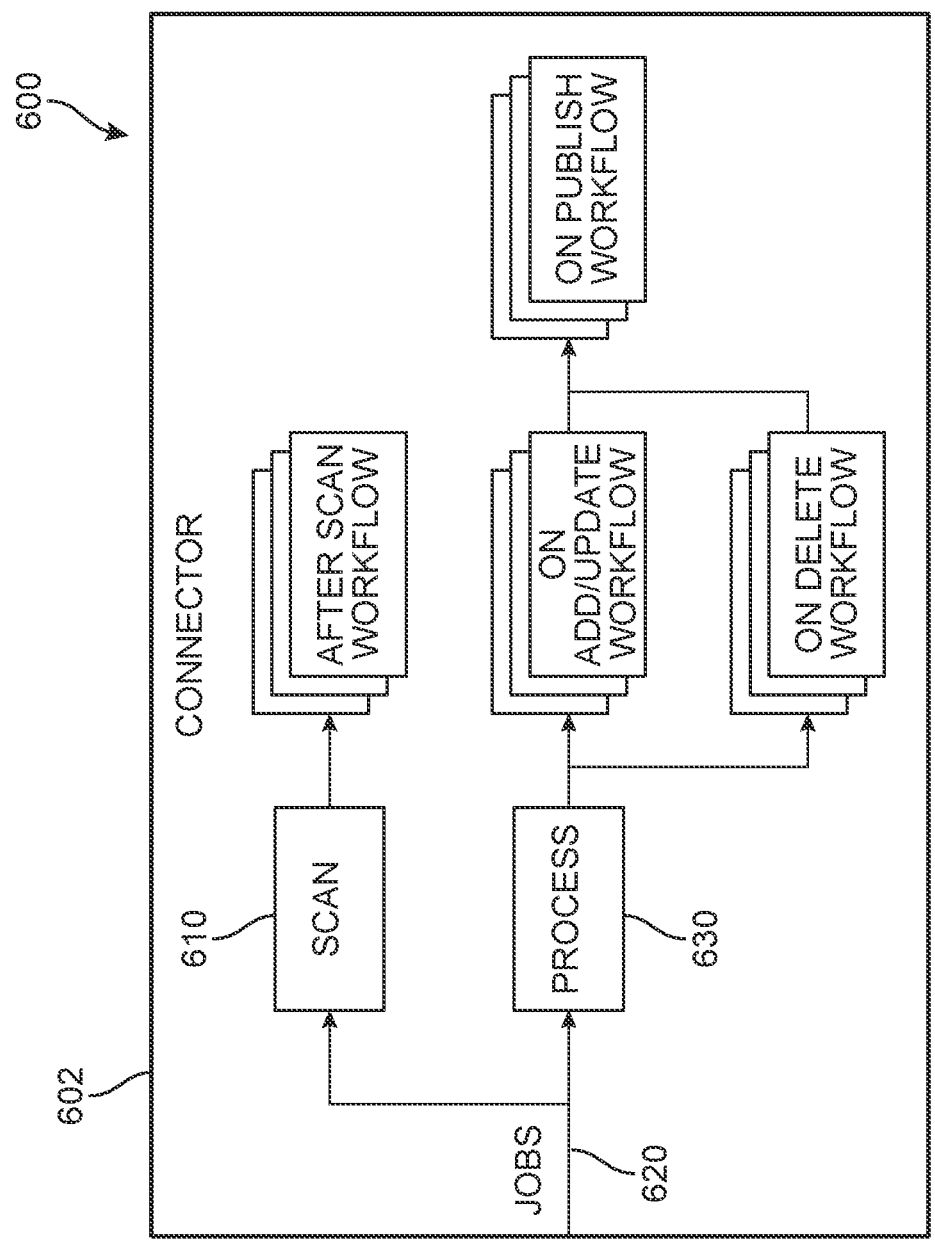
FIG. 6 is a schematic flow diagram presenting a processing flow of jobs through a connector module for the worker node of FIG. 5, according to an embodiment.

As a general matter, workflow can be shared between seeds. In some embodiments, the workflow will be configured in the UI. When creating seeds, one or more workflow will be able to be "attached" to the seed. This workflow will be run on the worker node and run sequentially. As shown in flow diagram 600 of FIG. 6, in order to handle batches throughout a connector framework 602 via a series of workflow pipelines 620, a batching mechanism that takes into account the fact that connectors and workflows are now being shared between seeds is implemented. In FIG. 6, it can be seen that jobs 602 received by the worker nodes are moved through the connector framework 602 over two paths, comprising a scan flow 610 and a process flow 630 to complete scanning and processing tasks in preparation for publishing.

Figure 7:
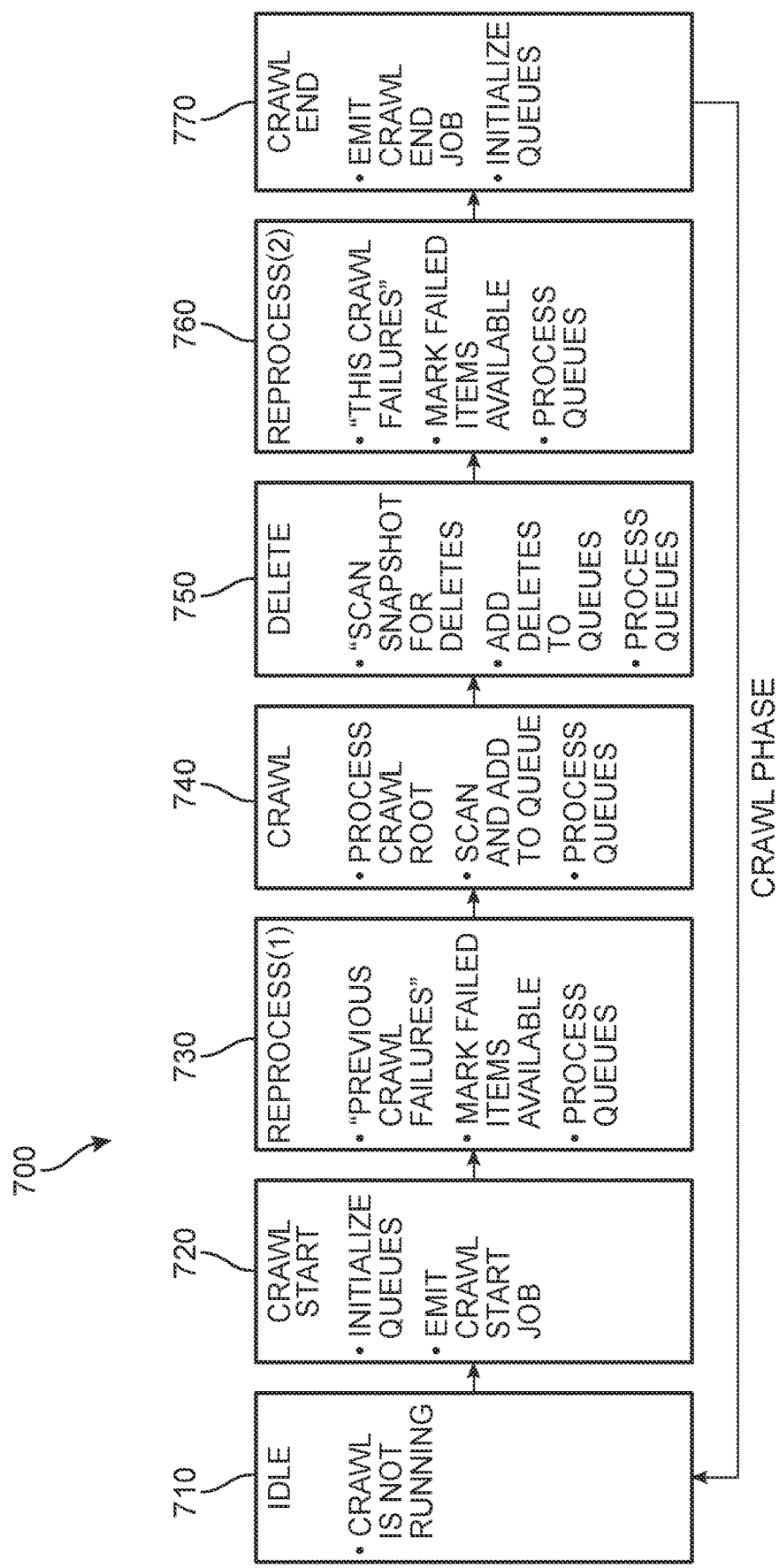
FIG. 7 is an illustration of various crawl phases and states for the content processing management environment, according to an embodiment.

Referring now to FIG. 7, an example of a method 700 of control of crawl state and progression by the manager is presented. It may be appreciated that maintaining consistency in crawl state, especially across failures, is important in order to ensure reliable and complete content processing even in the presence of system failures. In the present embodiments, the crawl state will be controlled by the manager node to which the crawl is assigned, which improves synchronization. In addition, the state of a crawl will be split in to two pieces: a "phase" of the crawl and a "state" within that "phase".

For purposes of this disclosure, crawl phase will indicate the action the crawl is performing at the current time, and crawl state further defines the exact nature of the work being done with in a given phase. The allowable states for a given phase will be a subset of all the possible states, with some states not being allowed in a given phase (e.g., "pausing" in the idle phase for instance). The diagram of FIG. 7 shows the phases, their order, and a brief summary of the actions they perform. A first phase ("Idle") 710 refers to a crawl that is not running, a second phase ("Crawl Start") 720 refers to a crawl that is initializing a queue, and/or emitting a crawl start job, a third phase ("Reprocess (1)") 730 refers to previous crawl failures, failed jobs available, and process queues, a fourth phase ("Crawl") 740 are process crawl roots, scan and add to queue, and process queues, a fifth phase ("Delete") 750 refer to functions like scan snapshots for deletes, add deletes to queues, and process queues, a sixth phase ("Reprocess (2)") 760 performs this crawl's failures, mark failed jobs available, and process queues, and a seventh phase ("Crawl End") 770 performs emit crawl end jobs, and initialize queues. In addition, the first phase 710 includes never, completed, aborted, and failed states, while the remaining second to seventh phases include initializing, running, pausing, paused, resuming, and aborting states.

Transitioning between phases and states within phases is a mechanism by which a crawl runs. Some transitions could be caused by user interaction (pressing a user interface button or making an API call to start, stop, pause or resume a crawl, for example) and others by natural crawl progression (exhausting the available jobs in the queue, for example).

Figure 8:
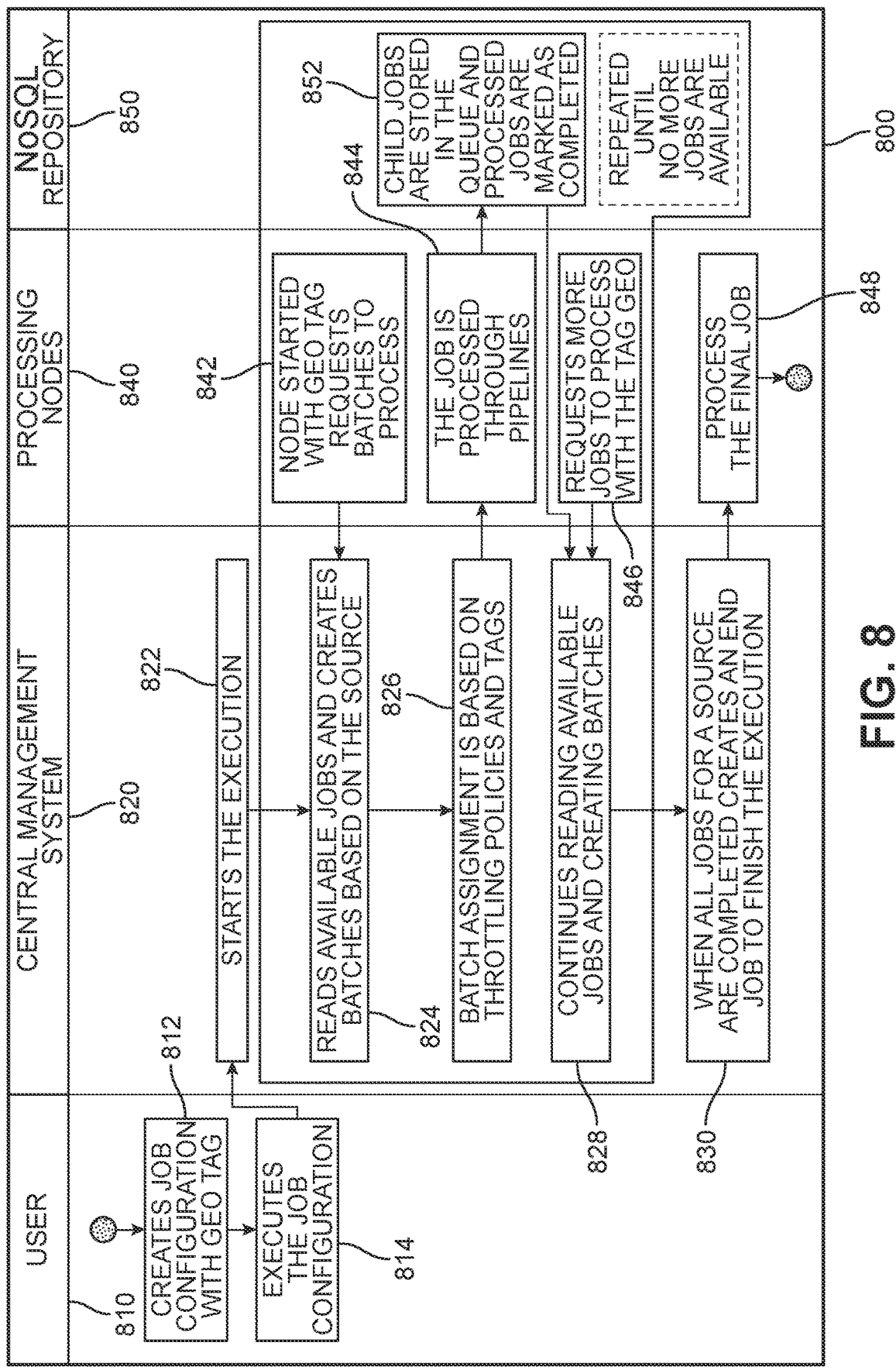
FIG. 8 is an example of a process flow diagram for the performance of jobs in the content processing management environment, according to an embodiment.

In different embodiments, the proposed systems can follow a management process 800, an example of which is depicted in FIG. 8. As a general matter, it should be understood that a content source may require a particular resource or may require execution on a particular node. If so, the content source will have "required tags" added. Jobs will only be executed on a node that has those tags. In other words, tags are necessary in order to identify the correct processing path for each job. Thus, content sources will have required tags, and create jobs. Those jobs are tagged with the tags from the content source. For example, see fourth step 940 discussed below. Typically, every content source produces one "root scanning job". This root job will then produce additional jobs as the content source repository is scanned. Tags will be copied from the content source, to the root scanning job, to all children or sub-jobs derived from the scanning the content source from the root scanning job. In addition, processing nodes are configured with tags indicating the features available or geographical location of the machine running the node. The processing nodes supply the tags they support when they ask for a batch of jobs. The management system understands the tags available, so it can generate a warning when it has jobs that cannot be processed due to a tag that cannot be satisfied.

In FIG. 8, a user interface component 810 enables a first step 812 of creating a job configuration with a tag (e.g., a GEO tag, or a GEO-UK tag, etc.). In a second step 814, the job is submitted for execution, moving to a central management system component 820, which starts the execution in a third step 822. Available jobs are read in a fourth step 824, creating batches based on the source, while the node started with the UK tag requests batches to process (step 842). Each batch assignment is based on throttling policies and tags, per a fifth step 826. The batch is assigned and the job is processed through pipelines via processing nodes component in a sixth step 844. In a seventh step 852, at a NoSQL repository component 850, child jobs are stored in the queue and processed jobs are marked as completed. The flow returns to the central management system component 820, which continues reading available jobs and creating batches in an eighth step 828. When all jobs for a source are completed, an end job is created to conclude the execution in ninth step 830, and the final job is processed in tenth step 848. Additional details regarding this process follow below.

In different embodiments, with respect to the broader system, it can be understood that a content processing management system (possibly containing multiple management nodes, see above) will be launched. Multiple processing nodes (aka worker nodes) are also launched with tags about what kind of jobs they can receive. This process is under local control, which can only decide how many to launch, as well as when, where, and with what tags (all other configuration is managed centrally, at the management node). A content source configuration is created, including information such as the repository URL, credentials, connection information, and the tags required for its jobs. In some embodiments, the management node provides a REST API for the configuration and the received information is in JSON format. In addition, in some embodiments, the content processing management system provides an administrator user interface to configure content sources.

The content processing management system then receives the configuration requests and uses the NoSQL provider to connect to a repository to fetch the configuration and jobs storage. After any required configuration is done, the content source can be initiated (e.g., 'start the scan') using the REST API of the management system or an administrator user interface. The content processing management system starts the scan, and a start job (e.g., the root job for the content source) is created in a queue in the NoSQL database. The content processing management system groups jobs into batches by content source. Batches are stored in an in-memory queue. This ensures that all jobs in a batch will have the same tags, since all jobs are from the same content source. Processing nodes request jobs for their configured tags from the content processing management system via a REST API.

The content processing management system can then receive the batch request from the processing nodes and check the in-memory queue for appropriate batches based on the tags. If available, a batch of jobs will be returned to the processing node. Furthermore, the content processing management system ensures that the jobs in the batch only contain tags which can be handled by the processing node which made the request. If the processing node receives batches, it updates the job's status in the queue from "available" to "in-progress" using the NoSQL provider, and acknowledges the update to the content processing management system using the REST API. In cases where the REST API acknowledgement request fails, the content processing management system, after some time, will again read the assigned jobs from the NoSQL provider queue into the in-memory queue so the jobs can be re-assigned later.

The processing nodes download and install any required software component to process the jobs from the artifact repository. The selection of software is based on the content source configuration, which has been previously downloaded by the processing node from the content processing management system. Once the batches are received by the processing node the jobs are enqueued into a set of pipelines, each pipeline containing multiple content processing stages that execute different tasks, such as but not limited to scanning the job for child jobs, fetching metadata or content, as well as performing text extraction, text analysis, optical character recognition, metadata enrichment, and/or publishing to other repositories. Scanning jobs may give rise to new jobs (e.g., scanning a folder will typically produce many document-scanning jobs for documents within the folder). These newly discovered jobs are added to the job queue in the NoSQL repository. When the job processing is complete the node will update the job status as 'completed' in the storage queue.

In different embodiments, the content processing management system will continue reading available jobs, and creating and distributing batches as requested. When all jobs from a content source have been processed, the management system creates an end job and adds it to the queue. The processing node will then receive the end job. The processing of the end job includes tasks such as but not limited to cleaning resources, closing connections, and communicating requests to repositories where data is being published. When the end job status is updated as complete, the management system will consider the execution of the content source to be complete.

Figure 9:
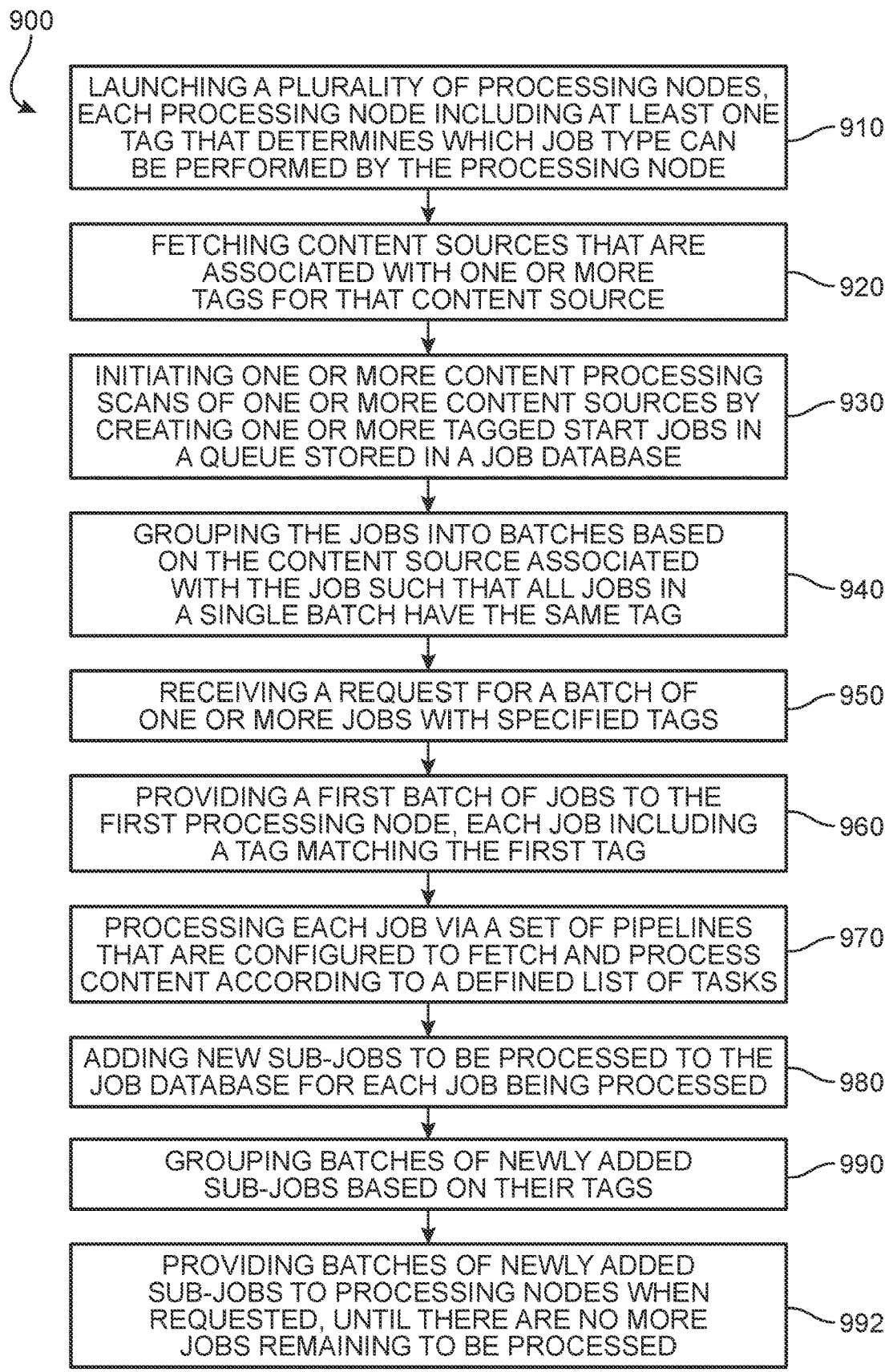
FIG. 9 is a flow chart depicting a method of managing digital content, according to an embodiment.

FIG. 9 is a flow chart illustrating an embodiment of a computer-implemented method 900 of processing digital content via a content processing management system. The method 900 includes a first step 910 of launching, at a plurality of computing devices, a plurality of processing nodes, each processing node including at least one tag that determines which job type can be performed by the processing node and a second step 920 of fetching, by the first content processing management system, a plurality of content sources, each content source being associated with one or more tags for that content source. A third step 930 includes initiating, by the first content processing management system, one or more content processing scans of one or more content sources by creating one or more start jobs in a queue stored in a job database, the jobs being tagged to the content source being scanned, and a fourth step 940 includes grouping, at the first content processing management system, the jobs of the plurality of jobs into batches based on the content source associated with the job such that all jobs in a single batch have the same tag. The method 900 further includes a fifth step 950 of receiving, from a first processing node and at the content processing management system, a request for a batch of one or more jobs with at least a first tag matching the tags of the requesting processing node, a sixth step 960 of providing, from the content processing management system, a first batch of jobs to the first processing node, each job in the first job set including a tag matching the first tag, and a seventh step 970 of processing, at the first processing node, each job via a set of pipelines, wherein each pipeline of the set of pipelines is configured to fetch and process content according to a defined list of tasks. In addition, the method 900 includes an eighth step 980 of adding, at the first processing node and via a database provider, new sub-jobs to be processed to the job database for each job being processed, a ninth step 990 of grouping, at the content processing management system, batches of newly added sub-jobs based on their tags, and a tenth step 992 of providing, at the content processing management system, batches of newly added sub-jobs to processing nodes when requested, such that the jobs provided match the tags of the corresponding requesting processing node, until there are no more jobs remaining to be processed. As demonstrated by the method 900, the processing node can identify new jobs to be processed (e.g. files within a directory, and sub-directories of files within directories), and that these newly-found jobs can be then coordinated, batched, and distributed to other processing nodes distributed around the world.

In other embodiments, the method 900 may include additional steps or aspects. For example, the method 900 can further include a step of receiving, at the content processing management system, a content source configuration that includes connection information for the content source and tags required for its jobs, where the content source is accessed via the connection information. In some examples, the connection information includes a URL, username, password, etc. In another embodiment, the method 900 also includes a step of automatically downloading, at the first processing node and from the content processing management system, the content source configuration. In some embodiments, the method 900 includes an additional step of automatically downloading and installing, at the first processing node and from an artifact repository, all required software components necessary to fetch content and process said content as required to execute the jobs for the content source. In different embodiments, the method 900 can also include a step of updating, at the first processing node and via a database provider, the status of each job processed in the job database.

In one embodiment, each pipeline contains an ordered list of distinct tasks, the tasks selected from any of scanning the job for child jobs, fetching metadata, fetching the binary content of a document, identifying the format of the document, translating the document to a new language, extracting images from the document, performing OCR (Optical Character Recognition) of the images, and performing text extraction, publishing to other repositories, publishing to search engines, fetching access control lists, scanning content for Personally Identifiable Information (PII), scanning content for Personal Health Information (PHI), scanning content for intellectual property, scanning the content for Material Non-Public Information (MNPI), setting access control lists, fetching user group membership, or creating a summary of the document content.

In another embodiment, processing nodes may be geographically remote from the content processing management system, for example in a different country, availability zone, or network, such that all content scanning, fetching and processing occurs within the processing node's country, availability zone or network which may be different than the country, availability zone or network of the content processing management system. In some embodiments, processing nodes may be connected to the content processing management node via a low-bandwidth connection. In different embodiments, processing nodes may be running on different hardware, machine types, or operating systems than the content processing management node. This can include legacy and out-of-support hardware as may be necessary to scan and process content from legacy content sources.

In different embodiments, processing nodes are managed independently of the management of the content processing management system, and processing node management is limited to starting and stopping the processing nodes and assigning tags to those processing nodes. In one embodiment, the content processing management node controls the number of jobs provided to processing nodes at any one time in order to ensure that processing nodes stay within throttling limitations, thereby further ensuring that legacy content source systems are not unduly overburdened with requests from multiple processing nodes.

Other methods may be contemplated within the scope of the present disclosure. For example, in some embodiments, a method of managing digital content is disclosed. The method includes a first step of launching, at a computing device, a plurality of processing nodes, each processing node including at least one tag that determines which job type can be performed by the processing node. A second step includes fetching, via a NoSQL provider and for the first management system, a plurality of jobs from a NoSQL repository, each job being associated with a content source and a tag for that content source, and a third step includes initiating, by the first management system, a scan by creating a start job in a queue of the NoSQL repository. The method further includes a fourth step of filtering, at the first management system, each of the jobs of the plurality of jobs into batches based on the content source associated with the job such that all jobs in a single batch have the same tag, and a fifth step of receiving, from a first processing node and at the content processing management system, a batch request for one or more jobs with tags matching a first tag. A sixth step includes providing, from the content processing management system, a first job set to the first processing node, each job in the first job set including a tag matching the first tag, and a seventh step includes processing each job via a set of pipelines of the first processing node, where each pipeline of the set of pipelines is configured to process content with respect to a different task. Furthermore, the method includes an eighth step of generating, at the content processing management system, an end job when all jobs associated with the first tag have been completed, and a ninth step of providing, to the first processing node and from the content processing management system, the end job. A tenth step involves updating, from the first processing node and at the content processing management system, a status of the end job when the end job is complete, and an eleventh step includes presenting, via a user interface for the content processing management system, a message indicating all jobs associated with the first tag have been completed.

In other embodiments, the method may include additional steps or aspects. For example, the method can further include a step of receiving, at the content processing management system, a content source configuration that includes a URL for the NoSQL repository and tags required for its jobs, wherein the NoSQL repository is accessed via the URL. In such cases, the method can also include a step of providing, at the content processing management system, a REST API for the content source configuration. In some embodiments, the content source configuration is in JSON format. In another example, the method also includes automatically downloading, at the first processing node and from the content processing management system, the content source configuration. In some embodiments, the method also includes steps of automatically downloading and installing, at the first processing node and from an artifact repository, a required software component to process the first job set based on the content source configuration.

In another example, processing of the end job by the first processing node includes cleaning its resources and closing connections. In some embodiments, the method further includes steps of updating, at the first processing node, a status of its jobs queue from available to in progress via the NoSQL provider in response to receiving the first job set from the content processing management system, and providing, from the first processing node, an acknowledgement request to the content processing management system via a REST API. In one embodiment, each pipeline executes a distinct task, the task being one of scanning the job for child jobs, fetching metadata, and performing text extraction and publishing to other repositories.

It should be understood that the systems and/or methods as described herein may be implemented using different computing systems, components, modules, and connections. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

In general, applications of the platform are built and deployed by a software framework. A software framework is a universal, reusable software environment that provides particular functionality as part of a larger software platform to facilitate development of software applications. Software frameworks may include support programs, compilers, code libraries, tool sets, and application programming interfaces (APIs) that enable development of a software application. Some implementations can provide a user device and/or component management platform that is capable of facilitating the development of software applications through the use of a user interface designed to be simple to use, and re-usable software components (e.g., buttons, links, fields, graphics, and/or the like) that can be displayed in the user interface and generated in multiple different software frameworks and/or programming languages for a variety of platforms. For example, the component management platform may provide a first software application that includes a user interface through which a user can develop a second software application. The user may use features of the user interface to create software components that are displayed in the first software application (e.g., the UI) using a first programming language (e.g., hypertext markup language (HTML) or another programming language associated with the first software application) and generated in a first software framework (e.g., a software framework associated with the software application being developed). The user interface may include features, such as drag and drop operations for the creation of software components and selectable software component characteristics, to facilitate creation and customization of software components. In some implementations, the component management platform may store components that were previously generated by users, generate copies of software components in multiple software frameworks and/or for different platforms, and make software components available for users to include in software applications that are under development.

In this way, a user device and/or component management platform may facilitate the development of software applications in multiple software frameworks and for multiple platforms, without requiring special knowledge or repeated component development on the part of a user, and in a manner designed to be relatively quick and efficient. Special software framework knowledge and/or familiarity may not be required, for example, by using a user interface to enable the generation of software components in multiple software frameworks in a single integrated development environment (IDE), such as a web-based IDE that is accessible from any device with a web browsing application browser. Some non-limiting examples of such frameworks include Microsoft.NET™, the EMC™ IDE, the Microsoft™ Visual Studios IDE for writing and debugging code, and the Eclipse™ IDE for incorporation of open source code. Reusable software components may significantly increase the speed and efficiency of software development, including facilitating more efficient use of software developer time and computing resources (e.g., processor resources, memory resources, and/or the like). Some implementations may reduce network communications relative to a purely cloud-based application development solution, e.g., by enabling the user device to perform much of the functionality for component and software application development without the need to interact with a server computer over a network, which would introduce latency into the development process. Furthermore, some implementations described herein use a rigorous, computerized process to perform tasks or roles that were not previously performed. Also, automating the process for generating software components conserves computing resources (e.g., processor resources, memory resources, and/or the like) and time that would otherwise be wasted by using manual development processes for attempting to create multiple software components in multiple software frameworks.

In some embodiments, the software development application may be an application installed on and executed by the user device. In some implementations, the software development application may be a web-based application designed to execute a web application (e.g., an application operating on a server computer or the component management platform, and implemented in HTML, JavaScript, and/or the like). The software development application may be written in a variety of programming languages and provide a variety of different types of user interface elements, which may be used in the development of a new software component and/or another software application. In some embodiments, the software development application includes a component toolbox. The component toolbox may be presented via a user interface offering one or more interactable user interface elements, such as buttons, which are associated with software components. For example, the component toolbox may include one or more buttons for the generation of software components, such as input components (e.g., buttons, checkboxes, dropdown lists, toggle buttons, text fields, and/or the like), navigational components (e.g., search fields, sliders, pagination indicators, links, icons, and/or the like), informational components (e.g., tooltips, progress bars, message boxes, images, and/or the like), and/or the like. In some implementations, the component toolbox may include user interface elements that generate a software component based on a pre-existing software component (e.g., a previously created software component). In some implementations, the component toolbox may include a user interface element designed to enable the creation of a new software component, which may enable a user of the user device to define a new type of software component.

In different embodiments, the platform can also rely on customized APIs developed and/or supported by the software development framework to generate interactive visualization dashboards. For purposes of this disclosure, Application Programming Interfaces (APIs) may refer to computer code that supports application access to operating system functionality. A platform dependent API may be understood to rely on the functionality of a particular software platform. The platform dependent API may use device specific libraries or native code allowing access to the mobile device at a low level. The API can be configured to provide a wide range of visualization dashboards for marketplace management.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A computer-implemented method of processing digital content via a content processing management system, the method comprising:
  launching, at a plurality of computing devices, a plurality of processing nodes, each processing node including at least one tag that determines which job type can be performed by the processing node;
  fetching, by the content processing management system, a plurality of content sources, each content source being associated with one or more tags for that content source;
  initiating, by the content processing management system, one or more content processing scans of one or more content sources by creating one or more start jobs in a queue stored in a job database, the jobs being tagged to the content source being scanned;
  grouping, at the content processing management system, the jobs into batches based on the content source associated with the job such that all jobs in a single batch have the same tag;
  receiving, from a first processing node and at the content processing management system, a request for a batch of one or more jobs with at least a first tag matching the tags of the first processing node;
  providing, from the content processing management system, a first batch of jobs to the first processing node, each job in the first batch of jobs including a tag matching the first tag;
  processing, at the first processing node, each job via a set of pipelines, wherein each pipeline of the set of pipelines is configured to fetch and process content according to a defined list of tasks;
  adding, at the first processing node and via a database provider, new sub-jobs to be processed to the job database for each job being processed;
  grouping, at the content processing management system, batches of newly added sub-jobs based on their tags; and
  providing, at the content processing management system, batches of newly added sub-jobs to processing nodes when requested, such that the jobs provided match the tags of the corresponding requesting processing node, until there are no more jobs remaining to be processed.

2. The method of claim 1, further comprising receiving, at the content processing management system, a content source configuration that includes connection information for the content source and tags required for its jobs, wherein the content source is accessed via the connection information.

3. The method of claim 2, further comprising automatically downloading, at the first processing node and from the content processing management system, the content source configuration.

4. The method of claim 3, further comprising automatically downloading and installing, at the first processing node and from an artifact repository, all required software components necessary to fetch content and process said content as required to execute the jobs for the content source.

5. The method of claim 1, further comprising updating, at the first processing node and via a database provider, the status of each job processed in the job database.

6. The method of claim 1, wherein each pipeline contains an ordered list of distinct tasks, the tasks selected from any of scanning the job for child jobs, fetching metadata, fetching binary content of a document, identifying the format of the document, translating the document to a new language, extracting images from the document, performing OCR (Optical Character Recognition) of the images, and performing text extraction, publishing to other repositories, publishing to search engines, fetching access control lists, scanning content for Personally Identifiable Information (PII), scanning content for Personal Health Information (PHI), scanning content for intellectual property, scanning the content for Material Non-Public Information (MNPI), setting access control lists, fetching user group membership, or creating a summary of the document content.

7. The method of claim 1, wherein processing nodes may be geographically remote from the content processing management system.

8. The method of claim 1, wherein processing nodes may be connected to a content processing management system via a low-bandwidth connection.

9. The method of claim 1, wherein processing nodes may be running on different hardware, machine types, or operating systems than the content processing management node.

10. The method of claim 1, wherein processing nodes are managed independently of the management of the content processing management system, wherein processing node management is limited to starting and stopping the processing nodes and assigning tags to those processing nodes.

11. The method of claim 1, wherein the content processing management node controls the number of jobs provided to processing nodes at any one time in order to ensure that processing nodes stay within throttling limitations.

12. A non-transitory computer-readable medium storing software comprising instructions executable by one or more computers which, upon such execution, cause the one or more computers to:
  launch, at a plurality of computing devices, a plurality of processing nodes, each processing node including at least one tag that determines which job type can be performed by the processing node;
  fetch, by a content processing management system, a plurality of content sources, each content source being associated with one or more tags for that content source;
  initiate, by the content processing management system, one or more content processing scans of one or more content sources by creating one or more start jobs in a queue stored in a job database, the jobs being tagged to the content source being scanned;
  group, at the content processing management system, the jobs into batches based on the content source associated with the job such that all jobs in a single batch have the same tag;
  receive, from a first processing node and at the content processing management system, a request for a batch of one or more jobs with at least a first tag matching the tags of the first processing node;
  provide, from the content processing management system, a first batch of jobs to the first processing node, each job in the first batch of jobs including a tag matching the first tag;
  process, at the first processing node, each job via a set of pipelines, wherein each pipeline of the set of pipelines is configured to fetch and process content according to a defined list of tasks;
  add, at the first processing node and via a database provider, new sub-jobs to be processed to the job database for each job being processed;
  group, at the content processing management system, batches of newly added sub-jobs based on their tags; and
  provide, at the content processing management system, batches of newly added sub-jobs to processing nodes when requested, such that the jobs provided match the tags of the corresponding requesting processing node, until there are no more jobs remaining to be processed.

13. The non-transitory computer-readable medium storing software of claim 12, wherein the instructions further cause the one or more computers to receive, at the content processing management system, a content source configuration that includes connection information for the content source and tags required for its jobs, wherein the content source is accessed via the connection information.

14. The non-transitory computer-readable medium storing software of claim 13, wherein the instructions further cause the one or more computers to automatically download, at the first processing node and from the content processing management system, the content source configuration.

15. The non-transitory computer-readable medium storing software of claim 14, wherein the instructions further cause the one or more computers to automatically download and install, at the first processing node and from an artifact repository, all required software components necessary to fetch content and process said content as required to execute the jobs for the content source.

16. The non-transitory computer-readable medium storing software of claim 12, wherein the instructions further cause the one or more computers to update, at the first processing node and via a database provider, the status of each job processed in the job database.

17. A system for processing digital content via a content processing management system, the system comprising one or more computers and one or more storage devices storing instructions that are operable, when executed by the one or more computers, to cause the one or more computers to:
  launch, at a plurality of computing devices, a plurality of processing nodes, each processing node including at least one tag that determines which job type can be performed by the processing node;
  fetch, by the content processing management system, a plurality of content sources, each content source being associated with one or more tags for that content source;
  initiate, by the content processing management system, one or more content processing scans of one or more content sources by creating one or more start jobs in a queue stored in a job database, the jobs being tagged to the content source being scanned;
  group, at the content processing management system, the jobs into batches based on the content source associated with the job such that all jobs in a single batch have the same tag;
  receive, from a first processing node and at the content processing management system, a request for a batch of one or more jobs with at least a first tag matching the tags of the first processing node;
  provide, from the content processing management system, a first batch of jobs to the first processing node, each job in the first batch of jobs including a tag matching the first tag;
  process, at the first processing node, each job via a set of pipelines, wherein each pipeline of the set of pipelines is configured to fetch and process content according to a defined list of tasks;
  add, at the first processing node and via a database provider, new sub-jobs to be processed to the job database for each job being processed;

group, at the content processing management system, batches of newly added sub-jobs based on their tags; and provide, at the content processing management system, batches of newly added sub-jobs to processing nodes when requested, such that the jobs provided match the tags of the corresponding requesting processing node, until there are no more jobs remaining to be processed.

18. The system of claim 17, wherein each pipeline contains an ordered list of distinct tasks, the tasks selected from any of scanning the job for child jobs, fetching metadata, fetching binary content of a document, identifying the format of the document, translating the document to a new language, extracting images from the document, performing OCR (Optical Character Recognition) of the images, and performing text extraction, publishing to other repositories, publishing to search engines, fetching access control lists, scanning content for Personally Identifiable Information (PII), scanning content for Personal Health Information (PHI), scanning content for intellectual property, scanning the content for Material Non-Public Information (MNPI), setting access control lists, fetching user group membership, or creating a summary of the document content.

19. The system of claim 17, wherein processing nodes may be geographically remote from the content processing management system.

20. The system of claim 17, wherein processing nodes may be connected to the content processing management system via a low-bandwidth connection.

21. The system of claim 17, wherein processing nodes may be running on different hardware, machine types, or operating systems than the content processing management node.

* * * * *